US012642625B2

(12) United States Patent
Yu et al.

(10) Patent No.: US 12,642,625 B2
(45) Date of Patent: Jun. 2, 2026

(54) METHODS OF CONTROLLING HAZE IN ORTHODONTIC APPLIANCES INCLUDING SEMI-CRYSTALLINE POLYMERS

(71) Applicant: SOLVENTUM INTELLECTUAL PROPERTIES COMPANY, Maplewood, MN (US)

(72) Inventors: Ta-Hua Yu, Woodbury, MN (US); Pamela A. Percha, Woodbury, MN (US); Karl J.L. Geisler, St. Paul, MN (US); Bruce R. Broyles, Oakdale, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 399 days.

(21) Appl. No.: 18/029,942

(22) PCT Filed: Oct. 5, 2021

(86) PCT No.: PCT/IB2021/059119

§ 371 (c)(1),
(2) Date: Apr. 3, 2023

(87) PCT Pub. No.: WO2022/079544

PCT Pub. Date: Apr. 21, 2022

(65) Prior Publication Data

US 2023/0363858 A1 Nov. 16, 2023

Related U.S. Application Data

(60) Provisional application No. 63/091,144, filed on Oct. 13, 2020.

(51) Int. Cl.
*A61C 7/08* (2006.01)

(52) U.S. Cl.
CPC .................................... *A61C 7/08* (2013.01)

(58) Field of Classification Search
CPC ........................................................ A61C 7/08
See application file for complete search history.

(56) References Cited

U.S. PATENT DOCUMENTS 5,213,754 A 5/1993 Kawaguchi
5,214,119 A 5/1993 Leir et al.
(Continued)

FOREIGN PATENT DOCUMENTS

WO 2010043419 A1 4/2010
WO 2018160870 A1 9/2018
(Continued)

OTHER PUBLICATIONS

Arnitel, Envialor Arnitel® EM460 Polyether Ester Elastomer, Apr. 2024, https://matweb.com/search/datasheet.aspx?matguid=c3ef2b33f9874782b46bae245ddff217&n=1&ckck=1 (Year: 2024).*
(Continued)

*Primary Examiner* — Christopher W Raimund

(57) ABSTRACT

A dental appliance includes a polymeric shell with a plurality of cavities for receiving one or more teeth, including an interior region with a core layer of a first thermoplastic polymer A with a thermal transition temperature of about 70° C. to about 140° C. and a flexural modulus greater than about 1.3 GPa, and first and second interior layers of a second thermoplastic polymer B with a glass transition temperature of less than about 0° C., a flexural modulus less than about 1 GPa, and an elongation a break of greater than 150%; and first and second exterior layers of a third thermoplastic polymer C with a thermal transition temperature of about 70° C. to about 140° C. and a flexural modulus greater than about 1.3 GPa. The dental appliance demonstrates enhanced optical properties, with enhanced light transmission and low haze.

20 Claims, 5 Drawing Sheets

(56) References Cited

U.S. PATENT DOCUMENTS

| | | | | |
|---|---|---|---|---|
| 5,597,302 | A * | 1/1997 | Pospisil | A61C 7/12 433/8 |
| 6,746,757 | B1 | 6/2004 | Takagi et al. | |
| 8,765,881 | B2 | 7/2014 | Hays et al. | |
| 8,905,756 | B2 | 12/2014 | Schwartz | |
| 9,655,691 | B2 | 5/2017 | Li et al. | |
| 9,655,693 | B2 | 5/2017 | Li et al. | |
| 10,052,176 | B2 | 8/2018 | Li et al. | |
| 10,067,278 | B2 | 9/2018 | Johnson et al. | |
| 10,286,635 | B2 | 5/2019 | Pudleiner et al. | |
| 10,549,511 | B2 | 2/2020 | Stewart et al. | |
| 10,968,565 | B2 | 4/2021 | Sick et al. | |
| 11,377,575 | B2 | 7/2022 | Cowman-Eggert et al. | |
| 2006/0078841 | A1 | 4/2006 | Desimone et al. | |
| 2007/0148608 | A1 | 6/2007 | Tadros | |
| 2007/0149663 | A1* | 6/2007 | Schmidt | C08K 5/0083 524/227 |
| 2016/0000243 | A1 | 1/2016 | Tedford, Jr. | |
| 2016/0228215 | A1* | 8/2016 | Li | B32B 27/365 |
| 2021/0137643 | A1* | 5/2021 | Phan | A61C 7/08 |
| 2022/0233276 | A1 | 7/2022 | Yu et al. | |

FOREIGN PATENT DOCUMENTS

| | | | |
|---|---|---|---|
| WO | 2018222864 | A1 | 12/2018 |
| WO | 2020079555 | A1 | 4/2020 |

OTHER PUBLICATIONS

PolyOne, Eastar 6763, Eastman Chemical Company—Copolyester, Jan. 2020, https://www.teameliteonline.com/wp-content/uploads/2020/01/document-15.pdf. (Year: 2020).*

MatWeb, Envalior Arnitel EM400 Polyester Ester Elastomer, https://apm.matweb.com/search/DataSheet.aspx?MatGUID=de2fed56ee9e4d8693938677ae0fd0fc&ckck=1. (Year: 2024).*

Shanks et al., "Thermoplastic Elastomers", www.intechopen.com, Mar. 2012, https://cdn.intechopen.com/pdfs/34065/InTech-Thermoplastic_elastomers.pdf. (Year: 2012).*

Thomas, Modulated DSC, Paper #6, "Measurement of Initial Crystallinity in Semi-Crystalline Polymers", TA Instruments, 2005, https://www.tainstruments.com/pdf/literature/TP_011_MDSC_num_6_Measurement_of_Initial_Crystallinity_in_Semi-Crystalline_Polymers.pdf. (Year: 2005).*

Androsch, "Application of Tammann's Two-Stage Crystal Nuclei Development Method for Analysis of the Thermal Stability of Homogeneous Crystal Nuclei of Poly(ethylene terephthalate)", 2015, Macromolecules, vol. 48, pp. 8082-8089.

Blaine, "Thermal Applications Note: Polymer Heats of Fusion", TN048, (Date unknown but believed to be prior to the date of the filing of the present application), 2 pages.

Djonlagic, "Handbook of Engineering and Specialty Thermoplastics", Ch-10 Thermoplastic Copolyester Elastomers, 2011, Faculty of Technology and Metallurgy, pp. 377-428.

International Search Report received for PCT International Application No. PCT/IB2021/059119, mailed on Dec. 7, 2021, 4 pages.

Lin, "Transparent Semi-Crystalline Polymeric Materials and their Nanocomposites: A Review", 2020, Polymer Engineering and Science, pp. 1-26.

Sperling, "Dilute Solution Thermodynamics, Molecular Weights, and Sizes", Introduction to Physical Polymer Science—CH-3, 2006, 4th Edition, Wiley Interscience, 84 Pages.

Su, "Improvement of Transparencies and Mechanical Properties of Poly(cyclohexylene dimethylene cyclohexanedicarboxylate) Parts Using a Compounding Nucleating Agent to Control Crystallization", 2019, Materials, vol. 12, No. 4, p. 1-18.

T. E. Breuer, Dimer Acids, in J. I. Kroschwitz (ed.), Kirk-Othmer Encyclopedia of Chemical Technology, 4th Ed., Wily, N.Y., 1993, vol. 8, pp. 223-237.

Thomas, "Modulated DSC® Paper #6 Measurement of Initial Crystallinity in Semi-crystalline Polymers", TP011, (Date unknown but believed to be prior to the date of the filing of the present application), 9 pages.

Thomas, "TA-227A—Characterization of Melting Phenomena in Linear Low Density Polyethylene by Modulated DSCTM", TA Instruments, (Date unknown but believed to be prior to the date of the filing of the present application), 7 pages.

Mileva, D., Tranchida, D., & Gahleitner, M. (2018). Designing polymer crystallinity: An industrial perspective. Polymer Crystallization, 1(2), Article e10009. https://doi.org/10.1002/pcr2.10009.

Technical Data Sheet of ECDEL 9967.

Technical Data Sheet of Trintan MX710.

Technical Data Sheet of TritanTX1000.

* cited by examiner

METHODS OF CONTROLLING HAZE IN ORTHODONTIC APPLIANCES INCLUDING SEMI-CRYSTALLINE POLYMERS

CROSS REFERENCE TO RELATED APPLICATIONS

This application is a national stage filing under 35 U.S.C. 371 of PCT/IB2021/059119, filed Oct. 5, 2021, which claims the benefit of U.S. Provisional Application No. 63/091,144, filed Oct. 13, 2020, the disclosures of which are incorporated by reference in their entireties herein.

BACKGROUND

Orthodontic treatments involve repositioning misaligned teeth and improving bite configurations for improved cosmetic appearance and dental function. Repositioning teeth is accomplished by applying controlled forces to the teeth of a patient over an extended treatment time period.

Teeth may be repositioned by placing a dental appliance such as a polymeric incremental position adjustment appliance, generally referred to as an orthodontic aligner or an orthodontic aligner tray, over the teeth of the patient. The orthodontic alignment tray includes a polymeric shell with a plurality of cavities configured for receiving one or more teeth of the patient. The individual cavities in the polymeric shell are shaped to exert force on one or more teeth to resiliently and incrementally reposition selected teeth or groups of teeth in the upper or lower jaw. A series of orthodontic aligner trays are provided for wear by a patient sequentially and alternatingly during each stage of the orthodontic treatment to gradually reposition teeth from misaligned tooth arrangement to a successive more aligned tooth arrangement until a desired tooth alignment condition is ultimately achieved. Once the desired alignment condition is achieved, an aligner tray, or a series of aligner trays, may be used periodically or continuously in the mouth of the patient to maintain tooth alignment. In addition, orthodontic retainer trays may be used for an extended time period to maintain tooth alignment following the initial orthodontic treatment.

A stage of an orthodontic treatment may require that a polymeric orthodontic retainer or aligner tray remain in the mouth of the patient for up to 22 hours a day, over an extended treatment time period of days, weeks or even months.

SUMMARY

The present disclosure is directed to orthodontic dental appliances configured to move or retain the position of teeth in an upper or lower jaw of a patient such as, for example, an orthodontic aligner tray or a retainer tray. An orthodontic dental appliance made from a relatively stiff polymeric material with a high flexural modulus selected to effectively exert a stable and consistent repositioning force against the teeth of a patient such as, for example, polyesters and polycarbonates, can cause discomfort when the dental appliance repeatedly contacts oral tissues or the tongue of a patient over an extended treatment time. These high modulus polymeric materials can also have poor stress retention behavior in hydrated state when used in an oral or other aqueous environment to provide a desired level of force persistence. Force persistence can be considered in tandem with stress relaxation, with the persistence an inverse of relaxation and defined as 100% minus % stress relaxation (e.g., a stress relaxation of 25% equates to a force persistence of 75%). A rubbery elastomer has excellent stress retention behavior, in many cases may be too soft to be used alone in a dental appliance to effectively move teeth into a desired alignment condition in a reasonably short treatment time.

In addition, the warm and moist environment in the mouth can cause the polymeric materials in the dental appliance to absorb moisture and swell, which can compromise the mechanical tooth-repositioning properties of the dental appliance. These compromised mechanical properties can reduce tooth repositioning efficiency and undesirably extend the treatment time required to active a desired tooth alignment condition. Further, in some cases repeated contact of the exposed surfaces of the dental appliance against the teeth of the patient can prematurely abrade the exposed surfaces of the dental appliance and cause discomfort.

Dental appliances such as orthodontic aligner and retainer trays can be manufactured by thermoforming a polymeric film to provide a plurality of tooth-retaining cavities therein. In some cases the thermoforming process can thin regions of a relatively rigid polymeric film selected to efficiently apply tooth repositioning force over a desired treatment time. This undesirable thinning can cause localized cracking of the thermoformed dental appliance when the patient repeatedly places the dental appliance over the teeth.

In general, the present disclosure is directed to dental appliances such as, for example, an orthodontic aligner tray or retainer tray, that include at least one layer of a semi-crystalline polymer to improve optical properties while maintaining an acceptable level of force persistence. The thermoplastic polymers in the dental appliance can be selected to provide other beneficial properties such as, for example, good stain resistance, and good mold release properties after the dental appliance is thermally formed from a multilayered polymeric film.

The present disclosure relates to thermoforming processes that tend to control the crystallization of the semi-crystalline polymer to balance force persistence and other advantageous mechanical properties with low haze and high light transmission. The term "thermoforming" refers to a process for preparing a shaped, formed, etc., article from a thermoformable film or web of polymeric material. In typical thermoforming, the thermoformable web may be heated to its melting or softening point, stretched over or into a temperature-controlled, single-surface mold and then held against the mold surface until cooled (solidified). The formed article may then be trimmed to remove excess thermoformed material. Thermoforming may include vacuum molding, pressure molding, plug-assist molding, vacuum snapback molding, etc.

In various embodiments, the dental appliance includes at least 5 polymeric layers, with softer polymeric interior layers disposed between a harder polymeric core layer and two harder polymeric outer layers. The hard core layer can enhance dimensional stability, while the softer middle layers positioned close to the outer skin layers can improve patient comfort and strain recovery. At least the softer middle layers include a semi-crystalline polymer, typically an elastomer.

In various embodiments, the soft polymeric interior layers have a flexural modulus lower than about 1 GPa, a glass transition temperature of less than about 0° C., and a vicat softening temperature of greater than 65° C. In various embodiments, the hard polymer core layer and the outer layers have a flexural modulus greater than 1.3 GPa and a thermal transition temperature in the range of about 70° C. to about 145° C. In various embodiments, the multilayered laminate dental appliance has an effective flexural modulus in the range of about 0.8 GPa to about 1.5 GPa, as well as excellent interfacial adhesion of greater than about 150 grams per inch (6 grams per mm).

In some embodiments, the multilayered dental appliance is transparent or translucent, and has enhanced crack resistance and force persistence, good staining resistance, improved patient comfort and improved dimensional stability.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1:
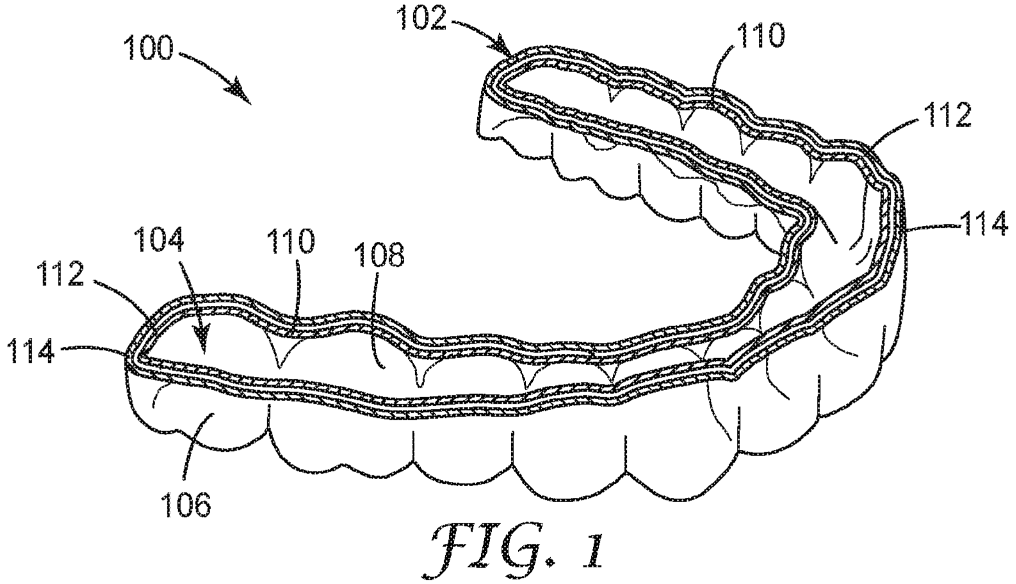
FIG. 1 is a schematic overhead perspective view of an embodiment of a multilayered dental appliance.

A dental appliance such as an orthodontic appliance 100 shown in FIG. 1, which is also referred to herein as an orthodontic aligner tray, includes a thin polymeric shell 102 having a plurality of cavities 104 shaped to receive one or more teeth in the upper or lower jaw of a patient. In some embodiments, in an orthodontic aligner tray the cavities 104 are shaped and configured to apply force to the teeth of the patient to resiliently reposition one or more teeth from one tooth arrangement to a successive tooth arrangement. In the case of a retainer tray, the cavities 104 are shaped and configured to receive and maintain the position of one or more teeth that have previously been aligned.

The shell 102 of the orthodontic appliance 100 is an arrangement of one or more layers of elastic polymeric materials that generally conforms to a patient's teeth, and may be transparent, translucent, or opaque. The polymeric materials can include at least one semi-crystalline polymer, typically an elastomer and are selected to provide maintain a sufficient and substantially constant stress profile during a desired treatment time, and to provide a relatively constant tooth repositioning force over the treatment time to maintain or improve the tooth repositioning efficiency of the shell 102. The shell may include a single layer of semi-crystalline polymer or multiple layers, at least one of which is a semi-crystalline polymer.

Figure 5:
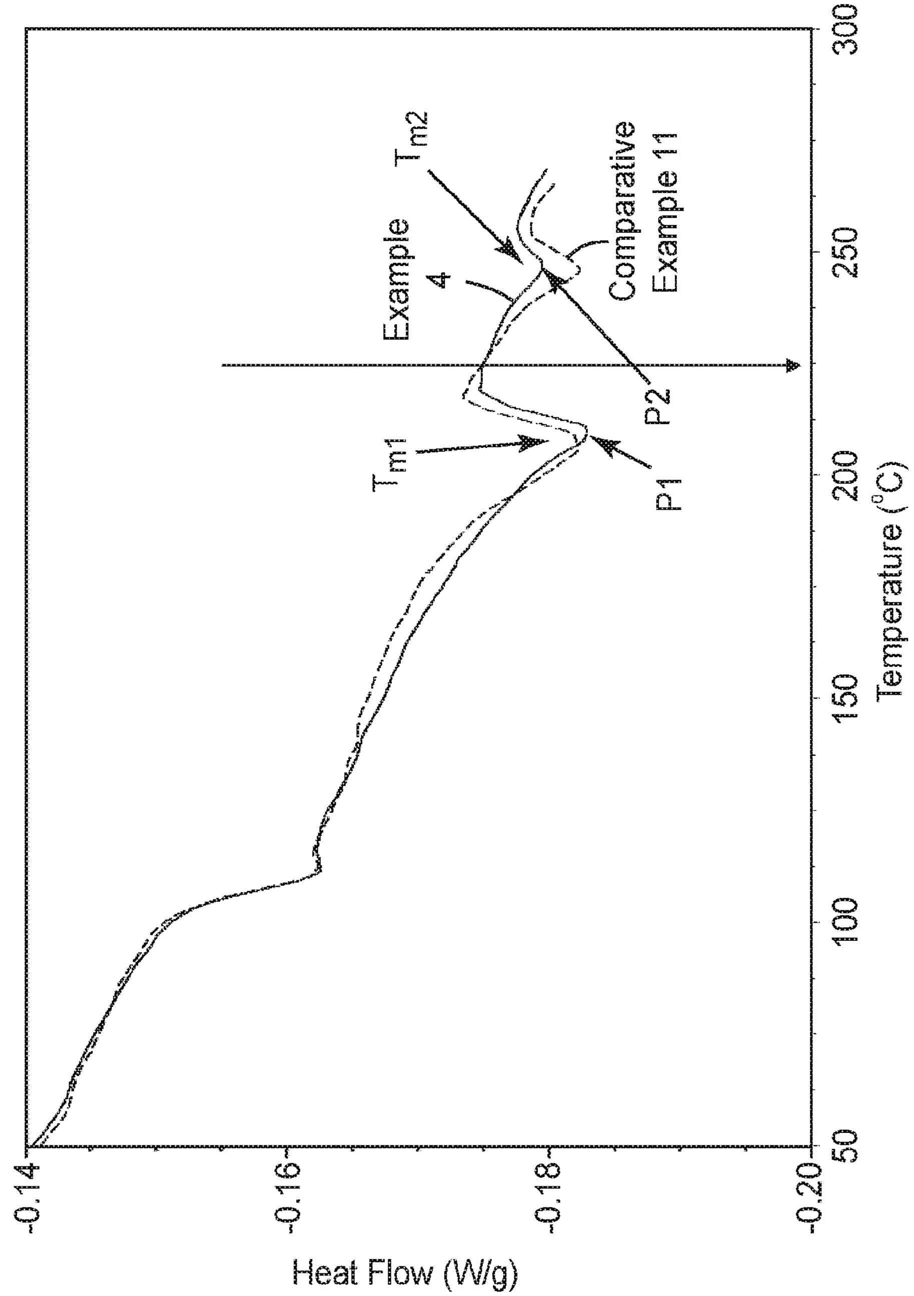
FIG. 5 depicts the heat flow signal from Modulated Differential Scanning calorimetry (MDSC™) results for the semi-crystalline containing films of Example 4 and Comparative Example 11, showing first and second identifiable melt temperatures.
Figure 6:
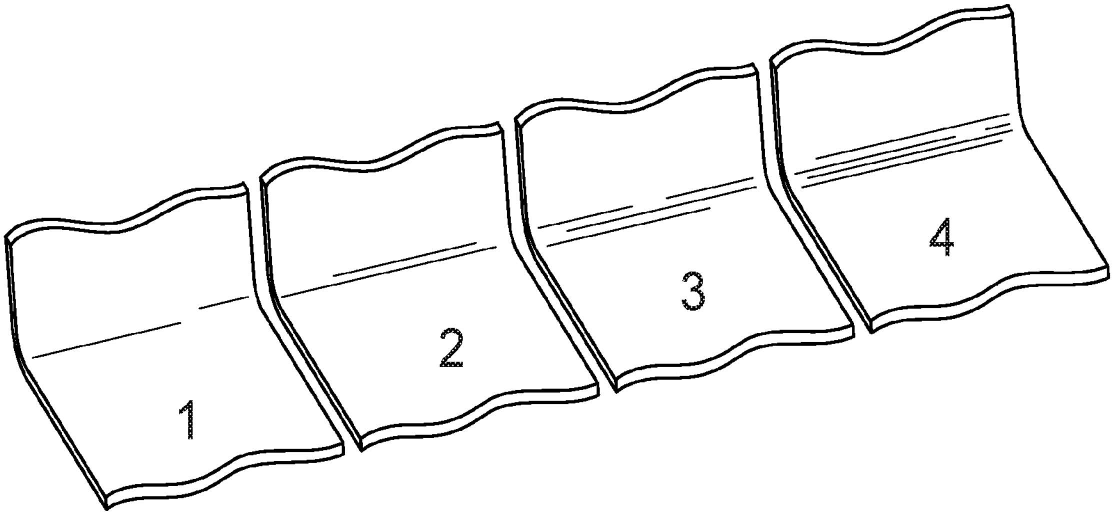
FIG. 6 is a perspective representation of the results of the Folding Crazing Resistance test detailed in the Example section of the present disclosure.

Semi-crystalline polymers can be distinguished from purely amorphous polymers in that they are composed of both crystalline and amorphous phases. The presence of crystalline regions may improve mechanical performance at elevated temperatures but tends to result in the scattering of visible light at the boundaries between crystalline and amorphous regions. Semi-crystalline polymers, typically, include a distribution of smaller crystals (for example, but not exclusively, less than 3 microns) that tend to melt a comparatively lower melting temperatures and larger crystals (for example but not exclusively greater than 3 or 4 microns) that tend to melt at comparatively higher melting temperatures. Semi-crystalline polymers can include one or more crystal melting temperature ranges determinable by MDSC™ (i.e., determinable endothermic peaks) at a constant heating rate of 4° C. per minute. Particularly suitable semi-crystalline polymers include at least a first identifiable melting temperature range with a first endothermic peak maxima and a second melting temperature range with a second endothermic peak maximum appearing at a higher temperature than the first maximum. (See FIG. 5). Other semi-crystalline polymers may include three or more melting temperature ranges each with an attendant endothermic peak maximum. For example, certain copolyester elastomers, including copolyester ether elastomers available under the ECDEL brand, include a first identifiable melting temperature range ($T_{m1}$) with upper bound at about 225° C. and a endothermic peak (P1) at about 208° C., as well as a second identifiable melting temperature range ($T_{m2}$) with a lower bound greater than about 230° C. and an endothermic peak at about 240° C. In some embodiments, the semi-crystalline polymer has a first identifiable melting point range ($T_{m1}$) with a lower bound greater than about 100° C., greater than about 150° C., or greater than about 180° C. Advantageously, the methods of the present disclosure can be used to improve the optical properties of the resulting article by heating the polymer to a temperature near but below the upper bound of first melting temperature range without necessarily relying on the biaxial or monoaxial stretching of the elastomer prior to creating an appliance.

Suitable semi-crystalline polymers can include polyesters and copolyesters, which may include ethylene glycol on the polymer backbone, or be free of ethylene glycol. Other suitable semi-crystalline polymers include polyolefins and polyolefin copolymers. Other suitable semi-crystalline polymers include polyethylene (low and high density), ultra-high molecular weight polyethylene, polyamide, polypropylene, nylon, nylon copolymer, polyacryletherketone, polyimide (AURUM) and ethylene vinyl acetate (EVA). Suitable specific, semi-crystalline polymers may further include polyethylene terephthalate (PET), polybutylene terephthalate (PBT), polyetherimide, polyetheretherketone, polyethersulfone, or polytrimethylene terephthalate, polyethylene naphthalate (PEN), polycyclohexylenedimethylene terephthalate (PCT) and mixtures and combinations thereof. Copolyesters may be synthesized via condensation polymerization, melt polymerization, solid-state polymerization, or combinations thereof.

Suitable commercially available semi-crystalline polymers include: the linear low density polyethylenes sold under the BYNEL brand by Dow; the polyolefin plastomers sold under the AFFINITY brand by Dow; ethylene-octene copolymers, ethylene butene, and other polyolefin elastomers sold under the ENGAGE brand by Dow; the α-olefin copolymers sold under the TAFMER brand by Mitsui Elastomer Singapore PTE LTD; the copolymers of ethylene and (m)ethyl acrylate sold under the ELVALOY brand by Dow; the ethylene vinyl acetate copolymer resins sold under the ELVAX brand by Dow; the linear low density polyethylenes sold under the ADMER brand by Mistui, the thermoplastic polyolefins sold under the HIFLEX and CATALLOY brands by LyondellBasell Industries Holdings B.V., and those polypropylene polymers and copolymers sold under the DEXFLEX and HOSTACOM brands by LyondellBasell.

The semi-crystalline polymers of the present disclosure may also be formed with a nucleating agent. Nucleating agents induce the formation of crystals in a given polymerized polymer composition. In the methods of the present disclosure, the use of nucleating agents tends to suppress the size of crystallites formed in the polymer. Adding nucleating agents to semi-crystalline polymers can effectively decrease the dimensions of crystals by accelerating the rate of nucleation and regulating the time scale of crystallization during cooling of the melt after thermoforming; this tends to create more yet smaller crystals upon cooling. The smaller crystals can be melted and reformed at a more forgiving range of melting and/or thermoforming temperatures, enhancing the ability to routinely manufacture articles having the desired optical properties.

Suitable nucleating agents may be inorganic, organic compounds, or a mixture thereof. Nucleating agents may be included to increase the clarity of the appliance by inducing a larger number of crystals which grow to a smaller size (such that they are otherwise known as clarifying agents) and may be added in any amount effective to induce such crystal effects, for example, in amounts of from 0 to about 2% by weight (such as from about 0.1 to about 0.8% by weight) of the semi-crystalline elastomer composition. Suitable nucleating agents may include one or more of: inorganic compounds such as talc, silica, kaolin, etc.; organophosphate salts, such as salts of diesters of phosphoric acid, sodium 2,2'-methylenebis (4,6,-di-tertbutylphenyl) phosphate or aluminum-hydroxy-bis[2,2'-methylene-bis(4,6-di-tbutylphenyl)phosphate; salts of monocarboxylic or polycarboxylic acids, sodium benzoate or aluminum tertbutylbenzoate; nonitol derivatives like 1,2,3-trideoxy-4,6:5,7-bis-0[(4-propylphenypmethylene]-nonitol; vinylcycloalkane polymers, vinylalkane polymers, and norbornane carboxylic acid salts. Presently preferred nucleating agents include sorbitol and its derivatives such as 1,3:2,4-dibenzylidene sorbitol (DBS), 1,3:2,4-Di-p-methylbenzylidene sorbitol (MDBS), and 1,3:2,4-bis(3,4-dimethyldibenzylidene) sorbitol (DMDBS). Nucleating agents tend to increase the relative distribution of smaller (e.g., less than 3 micron) crystals in the formed elastomeric appliance, which can then be melted and reformed by thermoforming at a sufficient melting temperature.

Suitable nucleating agents include, but are not limited to, ADK STAB NA-11, NA-27, NA-902, NA-960, NA-21 and NA-71 from Amfine Chemical Corporation, Hasbrouck Heights, New Jersey, EVERCLEAR 3940 from EVERSPRIN Chemical, Taiwan, OPIMA NA210 and NA 211 from Pluss Polymer Pvt. Ltd., India, Millad 3905, 3940, 3988 and NX8000 from Milliken Chemical, Spartanburg, South Carolina, NU-510 from SamA C&I Co., Ltd., Korea.

In the embodiment of FIG. 1, an arrangement of one or more polymeric layers 114, which also may be referred to herein as skin layers, forms an external surface 106 of the shell 102. The external surface 106 contacts the tongue and cheeks of a patient. An arrangement of one or more polymeric layers 110, which may also be referred to herein as skin layers, forms an internal surface 108 of the shell 102. The internal surface 108 contacts the teeth of a patient. An arrangement of one or more internal polymeric layers 112 resides between the polymeric layers 110 and 112. The thermoplastic polymeric materials in the layers 110, 112, 114 can be arranged to alternate such as, for example, in the arrangement ABA or BAB. For example, in the embodiment of FIG. 1, the layer 110 can include polymer A, the layer 114 can include polymer B, and the layer 112 can include polymer A. Or, the layer 110 can include polymer B, the layer 114 can include polymer A, and the layer 112 can include polymer B. Either or both of the polymer layers A and B may be semi-crystalline polymers.

Figure 2:
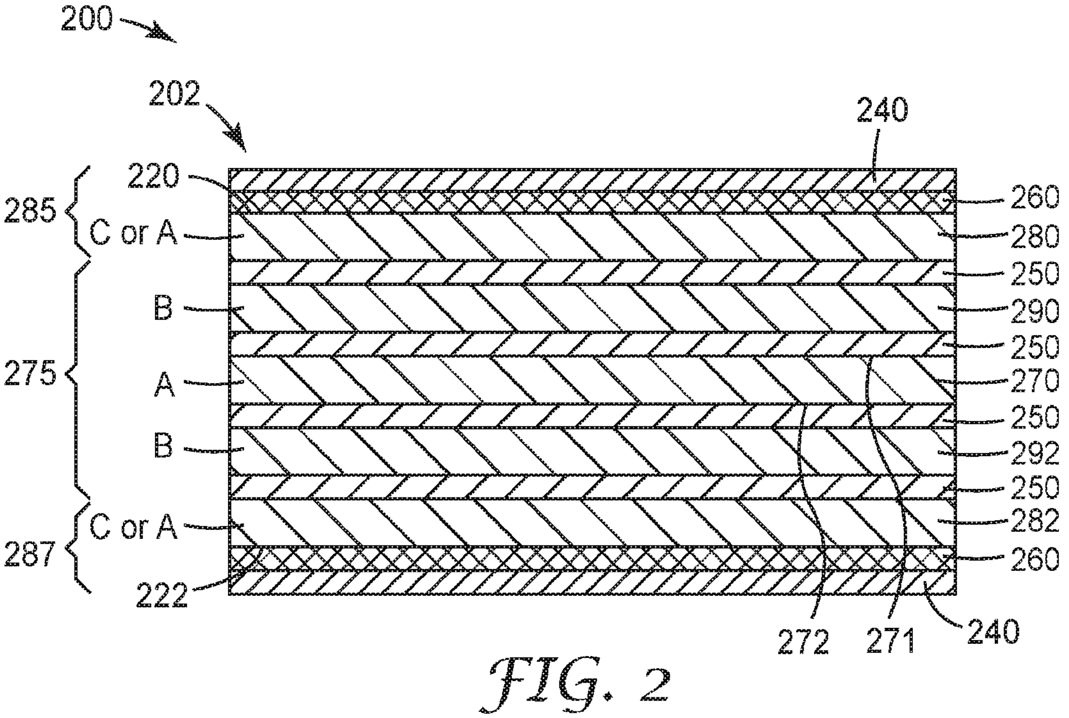
FIG. 2 is a schematic, cross-sectional view of an embodiment of a multilayered dental appliance of FIG. 1.

A schematic cross-sectional view of an embodiment of a dental appliance 200 is shown in FIG. 2, which includes a polymeric shell 202 with a multilayered polymeric structure. The polymeric shell 202 includes at least 3, or at least 5, or at least 7, alternating layers of thermoplastic polymers AB. The polymeric shell 202 includes an interior region 275 including a core layer 270 with a first major surface 271 and a second major surface 272. The interior region 275 further includes interior layers 290, 292 arranged on the first major surface 271 and the second major surface 272, respectively, of the core layer 270. The polymeric shell further includes exterior regions 285, 287 on opposed sides of the interior region 275. The exterior regions, which may also be referred to herein as skin layers, include first and second external surface layers 280, 282, which face outwardly on the exposed surfaces of the polymeric shell 202.

In some embodiments, the polymeric shell 202 has an overall flexural modulus necessary to move the teeth of a patient. In some embodiments, the polymeric shell 102 has an overall flexural modulus of greater than about 0.5 GPa, or about 0.8 GPa to about 1.5 GPa, or about 1.0 GPa to about 1.3 GPa.

In some embodiments, the interfacial adhesion between any of the adjacent layers in the polymeric shell 202 is greater than about 150 grams per inch (6 grams per mm), or greater than about 500 grams per inch (20 grams per mm).

In the embodiment of FIG. 2, the core layer 270 includes one or more layers of a thermoplastic polymer A with a thermal transition temperature of about 70° C. to about 140° C., or about 80° C. to about 120° C., and a flexural modulus greater than about 1.3 GPa, or greater than about 1.5 GPa, or greater than about 2 GPa. In some embodiments, the thermoplastic polymer A has an elongation at break of greater than about 100%. As used in the present disclosure, a thermal transition temperature is any one of glass transition (Tg), melting temperature (Tm), and Vicat softening temperature. Methods for determining these values are set out in the Examples below.

For example, the thermoplastic polymer A may include a polyester or a copolyester, which may include linear, branched or cyclic segments on the polymer backbone. Suitable polyesters and copolyesters may include ethylene glycol on the polymer backbone or be free of ethylene glycol. Suitable polyesters include, but are not limited to, copolyesters with no ethylene glycol available under the trade designation TRITAN from Eastman Chemical, Kingsport, TN, polyethylene terephthalate (PET), polyethylene terephthalate glycol (PETg), polycyclohexylenedimethylene terephthalate (PCT), polycyclohexylenedimethylene terephthalate glycol (PCTg), poly(1,4 cyclohexylenedimethylene) terephthalate (PCTA), polycarbonate (PC), and mixtures and combinations thereof. Suitable PETg resins, which contain no ethylene glycol on the polymer backbone, can be obtained from various commercial suppliers such as, for example, Eastman Chemical, Kingsport, TN; SK Chemicals, Irvine, CA; DowDuPont, Midland, MI; Pacur, Oshkosh, WI; and Scheu Dental Tech, Iserlohn, Germany. For example, EASTAR GN071 PETg resins and PCTg VM318 resins from Eastman Chemical have been found to be suitable.

In one embodiment, the first and second external surface layers 280, 282, which may be the same or different, each include one or more layers of the thermoplastic polymer A utilized in the core layer 270.

In another embodiment, the first and the second external surface layers 280, 282 may include at one or more layers of a thermoplastic polymer C, different from the thermoplastic polymer A, wherein the thermoplastic polymer C has a thermal transition temperature of about 70° C. to about 140° C., or about 80° C. to about 120° C., and a flexural modulus greater than about 1.3 GPa, or greater than about 1.5 GPa, or greater than about 2 GPa. In some embodiments, the thermoplastic polymer C has an elongation at break of greater than about 100% or even greater than 150%. In some embodiments, a thermoformable polymeric sheet, is comprised of at least two outer layers A and C, and a middle layer B, wherein the A and C layers individually include a thermoplastic polymer.

For example, in some embodiments the thermoplastic polymer C may include a polyester or a copolyester, which may be linear, branched, or cyclic. Suitable polyesters include, but are not limited to, copolyesters available under the trade designation TRITAN from Eastman Chemical, Kingsport, TN, polyethylene terephthalate (PET), polyethylene terephthalate glycol (PETg), polycyclohexylenedimethylene terephthalate (PCT), polycyclohexylenedimethylene terephthalate glycol (PCTg), poly(1,4 cyclohexylenedimethylene) terephthalate (PCTA), polycarbonate (PC), and mixtures and combinations thereof. Suitable PETg and PCTg resins can be obtained from various commercial suppliers such as, for example, Eastman Chemical, Kingsport, TN; SK Chemicals, Irvine, CA; DowDuPont, Midland, MI; Pacur, Oshkosh, WI; and Scheu Dental Tech, Iserlohn, Germany. For example, EASTAR GN071 PETg resins and PCTg VM318 resins from Eastman Chemical have been found to be suitable.

The interior layers 290, 292, which may be the same or different, each include one or more layers of a thermoplastic polymer B, different from the thermoplastic polymer A, wherein the thermoplastic polymer B has a glass transition temperature of less than about 0° C., a vicat softening temperature of greater than 65° C., or greater than about 100° C., inherent viscosity greater than 1 cc/gm, and a flexural modulus less than about 1 GPa, or less than about 0.8 GPa, or less than about 0.25 GPa, or less than 0.1 GPa (i.e., typically having a modulus alone insufficient to move teeth absent the presence of layer(s) A and/or C). In some embodiments, the thermoplastic polymers B have a melting temperature of greater than about 70° C., or greater than about 100° C., greater than about 150° C., or greater than about 200° C. In some embodiments, the thermoplastic polymers B have an elongation at break of greater than about 300%, or greater than about 400%. In some embodiments, the ratio of elongation at break of polymers B to either of polymers A and C is no greater than about 5, or no greater than about 3.

In various embodiments, which are not intended to be limiting, the thermoplastic polymers B in the interior layers 290, 292 are independently chosen from copolyester ether elastomers, copolymers of ethylene acrylates and methacrylates, ethylene methyl-acrylates, ethylene ethyl-acrylates, ethylene butyl acrylates, maleic anhydride modified polyolefin copolymers, methacrylic acid modified polyolefin copolymers, ethylene vinyl alcohol (EVA) polymers, styrenic block copolymers, ethylene propylene copolymers, and thermoplastic polyurethanes (TPU).

In some embodiments, the thermoplastic polymers B are chosen from copolyester ether elastomers, which may be linear, branched, or cyclic. Suitable examples include materials available under the trade designation NEOSTAR such as, for example, FN007, and ECDEL from Eastman Chemical, ARNITEL co-polyester elastomer from DSM Engineering Materials (Troy, MI), RITEFLEX polyester elastomer from Celanese Corporation (Irvine TX), HYTREL polyester elastomer from DowDuPont, copolymers of ethylene and methyl acrylate available from DowDuPont, Midland, MI under the trade designation ELVALOY, ethylene vinyl alcohol (EVA) polymers, and the like.

In various embodiments, suitable polymers B for the interior layers 290, 292 of the polymeric shell 202 have a flexural modulus less than about 0.24 GPa, or less than about 0.12 GPa.

In one embodiment, one or more layers of a TPU described in PCT Application No. IB2020/054004, which is copending with the present application, assigned to the present assignee, and incorporated by reference herein in its entirety, were used in the multilayered dental appliances described above as the thermoplastic polymer B. This TPU includes monomeric units derived from a polyisocyanate, at least one dimer fatty diol, and an optional hydroxyl-functional chain extender. In some embodiments, the TPU polymer includes hard microdomains formed by reaction between the polyisocyanate and the optional chain extender, as well as soft microdomains formed by reactions between the polyisocyanate and the dimer fatty diol.

The dimer fatty diols used to form the TPU are derived from dimer fatty acids, which are dimerization products of mono or polyunsaturated fatty acids and/or esters thereof. The related term trimer fatty acid similarly refers to trimerization products of mono- or polyunsaturated fatty acids and/or esters thereof.

Dimer fatty acids are described in, for example, T. E. Breuer, *Dimer Acids*, in J. I. Kroschwitz (ed.), Kirk-Othmer Encyclopedia of Chemical Technology, 4th Ed., Wily, N.Y., 1993, Vol. 8, pp. 223-237. The dimer fatty acids are prepared by polymerizing fatty acids under pressure, and then removing most of the unreacted fatty acid starting materials by distillation. The final product usually contains some small amounts of mono fatty acid and trimer fatty acids but is mostly made up of dimer fatty acids. The resultant product can be prepared with various proportions of the different fatty acids as desired.

The dimer fatty acids used to form the dimer fatty diols are derived from the dimerization products of C10 to C30 fatty acids, C12 to C24 fatty acids, C14 to C22 fatty acids, C16 to C20 fatty acids, and especially C18 fatty acids. Thus, the resulting dimer fatty acids include from 20 to 60, 24 to 48, 28 to 44, 32 to 40, and especially 36 carbon atoms.

The fatty acids used to form the dimer fatty diols may be selected from linear, branched, or cyclic fatty acids, which may be saturated or unsaturated. The fatty acids may be selected from fatty acids having either a cis/trans configuration and may have one or more than one unsaturated double bond. In some embodiments, the fatty acids used are linear monounsaturated fatty acids. The fatty acids may be hydrogenated or non-hydrogenated, and in some cases a hydrogenated dimer fatty residue may have better oxidative or thermal stability which may be desirable in a polyurethane.

In some embodiments, suitable dimer fatty acids can be the dimerization products of fatty acids including, but not limited to, oleic acid, linoleic acid, linolenic acid, palmitoleic acid, or elaidic acid. In particular, suitable dimer fatty acids are derived from oleic acid. The dimer fatty acids may be dimerization products of unsaturated fatty acid mixtures obtained from the hydrolysis of natural fats and oils, e.g., sunflower oil, soybean oil, olive oil, rapeseed oil, cottonseed oil, or tall oil.

In various embodiments, the molecular weight (weight average) of the dimer fatty acids used to make the TPU polymer described herein is 450 to 690, or 500 to 640, or 530 to 610, or 550 to 590.

In addition to the dimer fatty acids, dimerization usually results in varying amounts of trimer fatty acids, oligomeric fatty acids, and residues of monomeric fatty acids, or esters thereof, being present. In various embodiments, the dimer fatty acid used to make the dimer fatty diol should have a relatively low amount of these additional dimerization products, and the dimer fatty acid should have a dimer fatty acid (or dimer) content of greater than 80 wt %, or greater than 85 wt %, or greater than 90 wt %, or greater than 95 wt %, or up to 99 wt %, based on the total weight of polymerized fatty acids and mono fatty acids present.

Any of the above dimer fatty acid may be converted to a dimer fatty diol, and the resulting dimer fatty diol may have the properties of the dimer fatty acids described herein, except that the acid groups in the dimer fatty acid are replaced with hydroxyl groups in the dimer fatty diol. The dimer fatty diol may be hydrogenated or non-hydrogenated.

In some embodiments, which are not intended to be limiting, the dimer fatty diol is derived from a fatty acid with a C18 alkyl chain. In one embodiment, the dimer fatty diol is a C36 diol available from Croda, Inc., New Castle, DE, under the trade designation PRIPOL 2033. One depiction of the structure of PRIPOL 2033 is shown below:

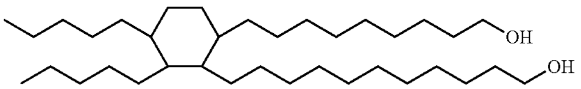

Pripol 2033

The polyisocyanate reactant used to make the TPU polymer includes at least one isocyanate with a functionality of at least 2, and in various embodiments may be an aliphatic isocyanate, such as hexamethylene 1,6-diisocyanate or isophorone diisocyanate (IPDI), or an aromatic isocyanate.

In some embodiments, the polyisocyanate is a an aromatic isocyanate, and suitable examples include, but are not limited to, toluene diisocyanate, m-phenylene diisocyanate, p-phenylene diisocyanate, xylylene diisocyanate, 4,4'-diphenylmethane diisocyanate, hexamethylene diisocyanate, isophorone diisocyanate, polymethylenepolyphenyl diisocyanate, 3,3'-dimethyl-4,4'-biphenylene diisocyanate, 3,3'-dimethyl-4,4'-diphenylmethane diisocyanate, 3,3-dichloro-4,4'-biphenylene diisocyanate, 1,5-naphthalene diisocyanate, modified compounds thereof such as uretonimine-modified compounds thereof, and mixtures and combinations thereof.

In one embodiment, the isocyanate component includes 4,4'-diphenylmethane diisocyanate (MDI), or a mixture of MDI and a uretonimine-modified 4,4'-diphenylmethane diisocyanate (modified MDI).

The optional hydroxyl-functional chain extender has two or more active hydrogen groups and in some embodiments includes polyols such as ethylene glycol, diethylene glycol, propylene glycol, 1,4-butylene glycol, 1,5-pentylene glycol, methylpentanediol, isosorbide (and other iso-hexides), 1,6-hexylene glycol, neopentyl glycol, trimethylolpropane, hydroquinone ether alkoxylate, resorcinol ether alkoxylate, glycerol, pentaerythritol, diglycerol, and dextrose; dimer fatty diol; aliphatic polyhydric amines such as ethylenediamine, hexamethylenediamine, and isophorone diamine; aromatic polyhydric amines such as methylene-bis(2-chloroaniline), methylenebis(dipropylaniline), diethyl-toluenediamine, trimethylene glycol di-p-aminobenzoate; alkanolamines such as diethanolamine, triethanolamine, diisopropanolamine, and mixtures and combinations thereof.

In various embodiments the hydroxyl-functional chain extender is a polyol, particularly a diol with an aliphatic linear or branched carbon chain having from 1 to 10, or 3 to 7 carbon atoms. Suitable diols include, but are not limited to, ethylene glycol, propylene glycol, diethylene glycol, propylene glycol, 1,4-butylene glycol, 1,5-pentylene glycol, 1,6 hexylene glycol (1,6 hexane diol), methylpentanediol, isosorbide (and other iso-hexides), and mixtures and combinations thereof. In certain embodiments, one or both of polymers A and C can comprise (i.e., modified by) 16 mole % to 32 mole % of 2,2,4,4-tetramethyl-1,3-cyclobutanediol.

In some embodiments, the TPU may most conveniently be prepared by a reactive extrusion process in which a polymeric reactive extrusion composition including the polyisocyanate, at least one dimer fatty diol, the optional hydroxyl-functional chain extender, and any other optional components such as crosslinkers, catalysts, and the like are loaded into an extruder and extruded from an appropriate die to form a layer in a multilayered polymeric film. In some embodiments, the multilayered film may later be thermoformed into a dental appliance with tooth-retaining cavities. In another embodiment, the reactive extrusion composition including the TPU may be injected into a mold.

Referring again to FIG. 2, the polymeric shell 202 further includes additional optional performance enhancing layers that can be included to improve properties of the shell 202. In various embodiments, which are not intended to be limiting, the performance enhancing layers can be, for example, barrier layers that are resistant to staining and moisture absorption; abrasion-resistant layers; cosmetic layers that may optionally include a colorant, or may include a polymeric material selected to adjust the optical haze or visible light transparency of the polymeric shell 202; tie layers that enhance compatibility or adhesion between layers AB or BC, elastic layers to provide a softer mouth feel for the patient; thermal forming assistant layers to enhance thermoforming, layers to enhance mold release during thermoforming, and the like.

The performance enhancing layers may include a wide variety of polymers selected to provide a particular performance benefit, but the polymers in the performance enhancing layers are generally selected from materials that are softer and more elastic than the polymers ABC. In various embodiments, which are not intended to be limiting, the performance enhancing layers include thermoplastic polyurethanes (TPU) and olefins.

In some non-limiting examples, the olefins in the performance enhancing layers are chosen from polyethylene (PE), polypropylene (PP), polymethylpentene (PMP), cyclic olefins (COP), copolyolefins with moieties chosen from ethylene, propylene, butene, pentene, hexene, octene, C2-C20 hydrocarbon monomers with polymerizable double bonds, and mixtures and combinations thereof; and olefin hybrids chosen from olefin/anhydride, olefin/acid, olefin/styrene, olefin/acrylate, and mixtures and combinations thereof.

For example, in the embodiment of FIG. 2, the polymeric shell 202 includes an optional moisture barrier layer 240 on each external surface, which can prevent moisture intrusion into the underlying polymeric layers and maintain for the shell 202 a substantially constant stress profile during a treatment time. The polymeric shell 202 further includes tie or thermoforming assist layers 250, which can be the same or different, between individual layers AB or BC. In some embodiments, the tie/thermoforming assist layers 250 can improve compatibility between the polymers in the layers AB or BC as the polymeric shell 202 is formed from a multilayered polymeric film, or reduce delamination between layers AB or BC and improve the durability and crack resistance of the polymeric shell 202 over an extended treatment time. The polymeric shell 202 in FIG. 2 further includes elastic layers 260, which can be the same or different, and can be included to improve the softness or mouth feel of the shell 202. In the embodiment of FIG. 2, the elastic layers 260 are located proximal the major surfaces 220, 222 of the shell 202.

Figure 3:
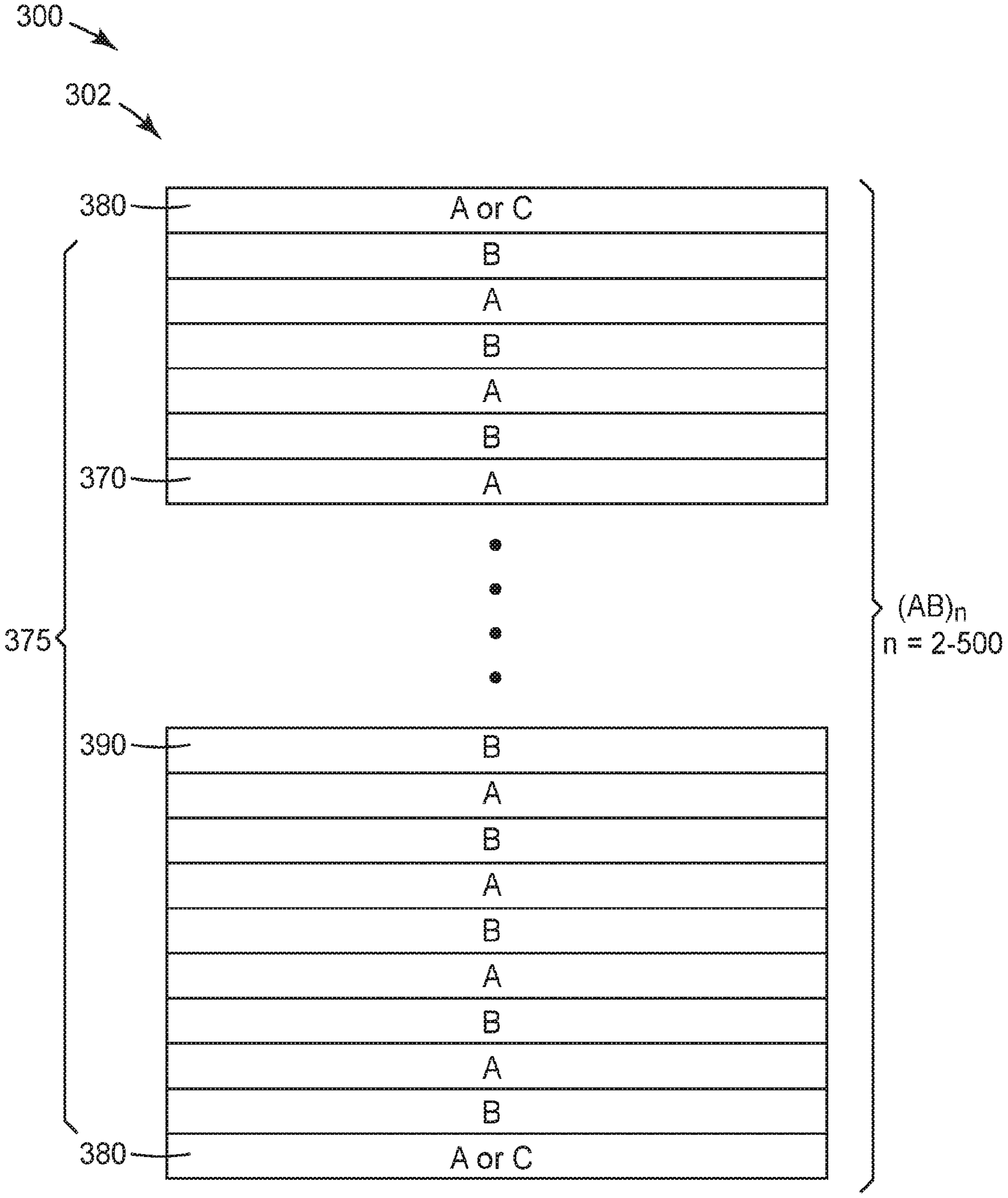
FIG. 3 is a schematic, cross-sectional view of an embodiment of a multilayered dental appliance of FIG. 1.

A schematic cross-sectional view of another embodiment of a dental appliance 300 is shown in FIG. 3, which includes a polymeric shell 302 with an interior region 375 having a multilayered polymeric structure $(AB)_n$, wherein n=2 to about 500, or about 5 to about 200, or about 10 to about 100. The layers AB include core layers 370, 390 of the thermoplastic polymers A and B discussed above with respect to FIG. 2. The external layers 380 of the polymeric shell 302 can include one or more layers of either of the thermoplastic polymers A or C discussed above.

Referring again to FIG. 1, in some embodiments, the polymeric shell 102 is formed from substantially transparent polymeric materials. In this application the term substantially transparent refers to materials that pass light in the wavelength region sensitive to the human eye (about 400 nm to about 750 nm) while rejecting light in other regions of the electromagnetic spectrum. In some embodiments, the reflective edge of the polymeric materials selected for the shell 102 should be above about 750 nm, just out of the sensitivity of the human eye.

In some embodiments, any or all of the layers of the polymeric shell 102 can optionally include dyes or pigments to provide a desired color that may be, for example, decorative or selected to improve the appearance of the teeth of the patient.

The orthodontic appliance 100 may be made using a wide variety of techniques. In one embodiment, a suitable configuration of tooth (or teeth)-retaining cavities are formed in a substantially flat sheet of a multilayered polymeric film that includes layers of polymeric material arranged like the configurations discussed described above with respect to FIGS. 1-3. In some embodiments, the multilayered polymeric film may be formed in a dispersion and cast into a film or applied on a mold with tooth-receiving cavities. In some embodiments, the multilayered polymeric film may be prepared by extrusion of multiple polymeric layer materials through an appropriate die to form the film. In some embodiments, a reactive extrusion process may be used in which one or more polymeric reaction products are loaded into the extruder to form one or more layers during the extrusion procedure.

In some embodiments, the multilayer polymeric film may later be thermoformed into a dental appliance with tooth-retaining cavities or injected into a mold including tooth-retaining cavities. The tooth-retaining cavities may be formed by any suitable technique, including thermoforming, laser processing, chemical or physical etching, and combinations thereof, but thermoforming has been found to provide good results and excellent efficiency. In some embodiments, the multilayered polymeric film is heated prior to forming the tooth-retaining cavities, or a surface thereof may optionally be chemically treated such as, for example, by etching, or mechanically embossed by contacting the surface with a tool, prior to or after forming the cavities.

A general process for thermoforming an appliance using the semi-crystalline polymer containing films of the present disclosure can share similarities with common thermoforming techniques. One, some, or all of the steps of method may be performed in a temperature and pressure controlled chamber. At the outset, a physical, dental model of the patient's teeth in a target or current arrangement is provided. A sheet of material including at least one layer comprised of a semi-crystalline polymer is provided and placed over the dental model. The model and the sheet of material are placed under a first pressure and heated to a first temperature near, but preferably below, the upper bound of the first identifiable melt temperature range ($T_{m1}$) of the semi-crystalline polymer. In particularly suitable methods, the model and the sheet of material are placed under a first pressure and heated to a first temperature near, but preferably below, the endothermic peak maxima (P1) of the first identifiable melt temperature range ($T_{m1}$). The combination of heat and pressure/or vacuum causes the material to soften. The model and sheet are maintained at the first temperature and pressure until such time as the sheet has conformed to the shape and orientation of the dental model and some of the crystalline structures in the polymer have melted. The temperature is subsequently decreased (preferably isobarically) to create a shell appliance in a configuration having a geometry corresponding to the dental arrangement of the first model.

In some embodiments, the polymeric film including one or more semi-crystalline polymers is heated to a temperature above the Tg, for example, above 120° C., about 130° C., about 140° C., during the forming process. Typically, the first temperature is at least about 5° C. below the upper bound of a first identifiable melting temperature range ($T_{m1}$) of at least one of the one or more semi-crystalline polymers present in the film (e.g., about 200° C. to about 220° C.) (see e.g., the DSC curve of FIG. 5). However, various temperatures and times may be utilized. By heating near but below the upper bound of the first identifiable melt temperature range ($T_{m1}$), a sufficient number of seed crystals or nucleating sites remain in the semi-crystalline polymer to allow for heterogenous crystal formation on cooling. The heterogenous crystal formation will allow the crystalline phase of the cooled semi-crystalline polymer to retain the desired mechanical performance while reducing the haze of the article. In other embodiments, the molding temperature is at least about 6° C. below the first identifiable melting temperature ($T_{m1}$) of at least one of the one or more semicrystalline polymers present in the film, in some embodiments at least 7° C., at least 8° C., at least 9° C., at least 10° C., at least 11° C., at least 12° C. The likelihood of melting but allowing heterogeneous nucleation upon cooling is enhanced by the addition of a nucleating agent to the one or more semi-crystalline polymer layers, as noted above.

Heating to a temperature near the first melting peak but above the glass transition of the film can typically allow for at least 80%, at least 81%, at least 82%, at least 83%, at least 84%, and least 85%, at least 86%, at least 87%, at least 88%, at least 89%, at least 90% of the crystals present in the one or more semi-crystalline elastomers to be melted as the molding temperature nears the upper bound of the first identifiable melt temperature (TO and or the endothermic peak maximum (P1). The degree of melt can be determined by a melt fraction ratio for each example. Keeping the molding temperature below the upper bound if not the endothermic peak maximum, however, allows at least some of the crystalline structures or nucleating sites to remain in the film prior to cooling.

In some embodiments, the pressure applied is greater than 10 kPa, e.g., greater than 50 kPa, 75 kPa, 100 kPa, 125 kPa, or greater than 150 kPa. In some embodiments, the pressure is maintained for greater than 30 seconds, e.g., greater than 45 seconds, 60 seconds, 2.5 minutes, 5.0 minutes, 10 minutes, 20 minutes, 30 minutes, 60 minutes, greater than 90 minutes, or even greater than 120 minutes, before release of pressure back to nominal atmospheric pressure. The pressure may be applied by direct force on the polymeric film material and/or vacuum.

A first plurality of crystalline structures is formed in any semi-crystalline polymeric material as the temperature is reduced from first molding temperature to a subsequent temperature (e.g., room temperature). The crystalline structures formed help hold the appliance in a stored geometry prior to irradiation or other suitable method of creating crosslinks in the polymeric material and are preferably sufficiently small so as not to contribute to a hazy appearance. In some or all embodiments, the temperature is gradually reduced. In other embodiments, appliance may be quenched by rapid reduction in temperature. In any event, it is presently preferred that the parameters selected remain consistent for each appliance For example, the rate of temperature reduction could be in the range of about $0.5°$ C. to about $10°$ C. per minute, but is typically held at the same rate within the range for each temperature reduction step in the process.

The multilayered polymeric film, the formed dental appliance, or both, may optionally be crosslinked with radiation chosen from ebeam, gamma, UV, and mixtures and combinations thereof.

Irradiation, if used to crosslink the material, can be done at room temperature or at elevated temperatures typically below the first molding temperature. Irradiation can be performed in air, in vacuum, or in oxygen-free environment, including inert gases such as nitrogen or noble gases. Irradiation can be performed by using electron-beam, gamma irradiation, or x-ray irradiation. In some embodiments, an ionizing radiation (e.g., an electron beam, x-ray radiation or gamma radiation) is employed to crosslink the non-segmented, polymeric material. In specific embodiments, gamma radiation is employed to crosslink the substantially non-crosslinked polymeric material. In some embodiments, the irradiating (with any radiation source) is performed until the sample receives a dose of at least 0.25 Mrad (2.5 kGy), e.g., at least 1.0 Mrad (10 kGy), at least 2.5 Mrad (25 kGy), at least 5.0 Mrad (50 kGy), or at least 10.0 Mrad (100 kGy). In some embodiments, the irradiating is performed until the sample receives a dose of between 1.0 Mrad and 6.0 Mrad, e.g., between 1.5 Mrad and 4.0 Mrad.

In other embodiments, the appliance is treated to create chemical crosslinks using methods known in the art. For example, peroxides can be added to the polymer, and the polymer can be maintained at an elevated temperature after forming into the first stored geometry to allow the peroxides to react. In addition, silanes can be grafted to a polymer backbone, such as polyethylene, and the polymer can be crosslinked upon exposure to a hot, humid environment.

The thickness of the multilayer polymer film is chosen to provide a clinically appropriate thickness of the material in the resultant appliance. The thickness of the material should typically be selected such that the appliance is stiff enough to apply sufficient force to the teeth but remains thin enough to be comfortably worn. In various embodiments, the multilayered polymeric film used to form the dental appliance has a thickness of less than about 1 mm, or less than about 0.8 mm, or less than about 0.5 mm. The thickness of the walls of the resulting appliance may be between 0.05 mm and 2 mm, or between 0.1 mm and 1 mm.

In various embodiments, particularly those including one or more semi-crystalline polymers, the dental appliance is substantially optically clear. The Expected light transmission can be determined by ISO 13468-1:2019 or ASTM D1003-13 using CIE illuminate C and the Expected haze can be determined using ISO 14782-1:1999 or ASTM D1003-13 using CIE illuminate C The term "Expected" is used herein to indirectly represent the transmission and haze of a formed appliance, as the geometry (e.g., size and surface features) of the appliance is not conducive to direct testing. Instead, a representative polymeric film is subjected to the same temperature and processing conditions as would normally be used to create the appliance but without drawing the film down on a mold, allowing the film to remain sufficiently planar for subsequent testing.

Some embodiments have an Expected light transmission of at least about 50%. Some embodiments have an expected light transmission of at least about 75%. Some embodiments have an Expected haze of no greater than 15 or no greater than 10%. Some embodiments have an Expected haze of no greater than 5%. Some embodiments have an Expected haze of no greater than 2.5%. The Expected haze of dental appliance of certain presently preferred embodiments is less than 10% and the Expected light transmission of dental appliance is greater than 80%.

In some embodiments, the multilayered polymeric film may be manufactured in a roll-to-roll manufacturing process and may optionally be wound into a roll until further converting operations are required to form one or more dental appliances.

The orthodontic article 100 can exhibit a percent loss of relaxation modulus of 40% or less as determined by Dynamic Mechanical Analysis (DMA). The DMA procedure is described in detail in the Examples below. The loss is determined by comparing the initial relaxation modulus to the (e.g., 4 hour) relaxation modulus at $37°$ C. and 1% strain. It was discovered that orthodontic articles according to at least certain embodiments of the present disclosure exhibit a smaller loss in relaxation modulus than articles made of different materials. Preferably, an orthodontic article exhibits loss of relaxation modulus after hydration of 40% or less, 38% or less, 36% or less, 34% or even 32% or less. In some embodiments, the loss of relaxation modulus is at least 15%, 20%, or 25% or greater.

Figure 4:
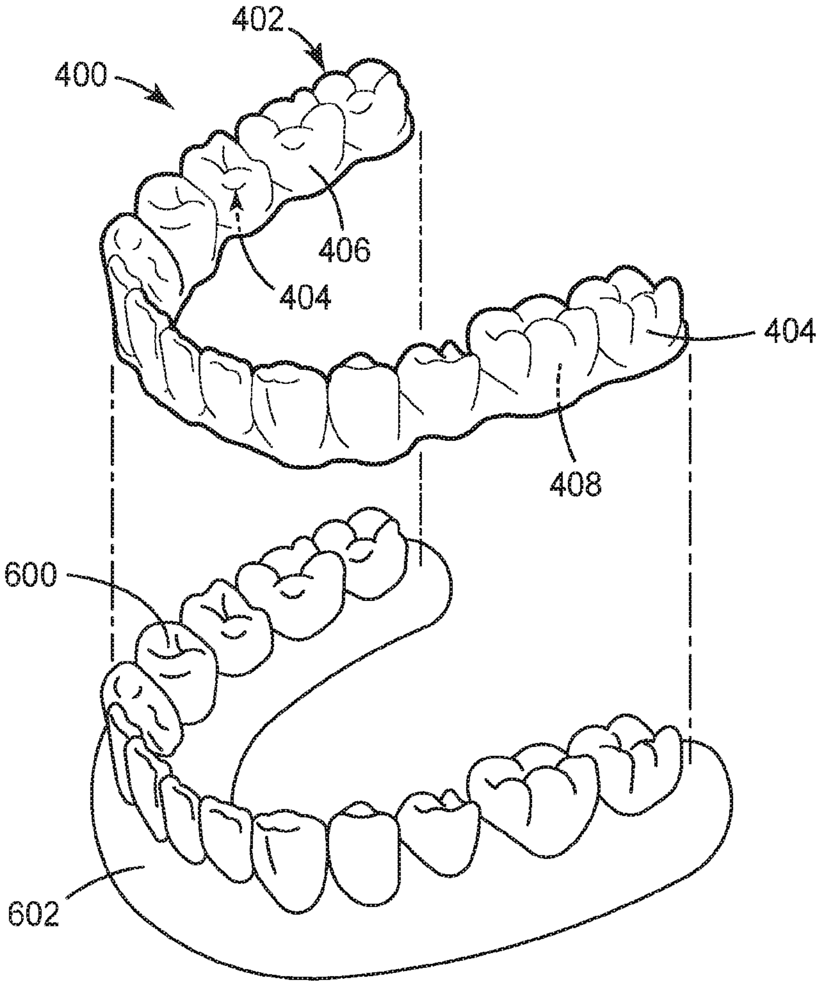
FIG. 4 is a schematic overhead perspective view of a method for using a dental alignment tray by placing the dental alignment tray to overlie teeth.

Referring now to FIG. 4, a shell 402 of an orthodontic appliance 400 includes an outer surface 406 and an inner surface 408 with cavities 404 that generally conform to one or more of a patient's teeth 600. In some embodiments, the cavities 404 are slightly out of alignment with the patient's initial tooth configuration, and in other embodiments the cavities 404 conform to the teeth of the patient to maintain a desired tooth configuration. In some embodiments, the shell 402 may be one of a group or a series of shells having substantially the same shape or mold, or incrementally different shapes, but which are formed from different polymeric materials, or different layers of polymeric materials, selected to provide a desired stiffness or resilience as needed to move the teeth of the patient. In some embodiments, the shell 402 may be one of a group or a series of shells having substantially the same shape or mold, or incrementally different shapes, but which are formed from the same polymeric materials, selected to provide a desired stiffness or resilience as needed to move the teeth of the patient. In this manner, in one embodiment, a patient or a user may alternately use one of the orthodontic appliances during each treatment stage depending upon the patient's preferred usage time or desired treatment time period for each treatment stage.

No wires or other means may be provided for holding the shell 402 over the teeth 600, but in some embodiments, it may be desirable or necessary to provide individual anchors on teeth with corresponding receptacles or apertures in the shell 402 so that the shell 402 can apply a retentive or other directional orthodontic force on the tooth which would not be possible in the absence of such an anchor.

The shells 402 may be customized, for example, for day time use and night time use, during function or non-function (chewing vs. non-chewing), during social settings (where appearance may be more important) and nonsocial settings (where the aesthetic appearance may not be a significant factor), or based on the patient's desire to accelerate the teeth movement (by optionally using the more stiff appliance for a longer period of time as opposed to the less stiff appliance for each treatment stage).

For example, in one aspect, the patient may be provided with a clear orthodontic appliance that may be primarily used to retain the position of the teeth, and an opaque orthodontic appliance that may be primarily used to move the teeth for each treatment stage. Accordingly, during the daytime, in social settings, or otherwise in an environment where the patient is more acutely aware of the physical appearance, the patient may use the clear appliance. Moreover, during the evening or night time, in nonsocial settings, or otherwise when in an environment where physical appearance is less important, the patient may use the opaque appliance that is configured to apply a different amount of force or otherwise has a stiffer configuration to accelerate the teeth movement during each treatment stage. This approach may be repeated so that each of the pair of appliances are alternately used during each treatment stage.

Referring again to FIG. 4, an orthodontic treatment system and method of orthodontic treatment includes applying to the teeth of a patient one or more incremental position adjustment appliances, each having substantially the same shape or mold, or incrementally different shapes. The incremental adjustment appliances may each be formed from the same or a different combination of polymeric materials, as needed for each treatment stage of orthodontic treatment. The orthodontic appliances may be configured to incrementally reposition individual or multiple teeth 600 in an upper or lower jaw 602 of a patient. In some embodiments, the cavities 404 are configured such that selected teeth will be repositioned, while other teeth will be designated as a base or anchor region for holding the repositioning appliance in place as the appliance applies the resilient repositioning force against the tooth or teeth intended to be repositioned.

Placement of the elastic positioner 400 over the teeth 600 applies controlled forces in specific locations to gradually move the teeth into the new configuration. Repetition of this process with successive appliances having different configurations eventually moves the teeth of a patient through a series of intermediate configurations to a final desired configuration.

The devices of the present disclosure will now be further described in the following non-limiting examples.

EXAMPLES

The following Examples are merely for illustrative purposes and are not meant to be overly limiting on the scope of the appended claims Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Unless otherwise noted, all parts, percentages, ratios, and the like in the Examples and the rest of the specification are provided on the basis of weight. Solvents and other reagents used may be obtained from Sigma-Aldrich Chemical Company (Milwaukee, WI) unless otherwise noted.

Materials

PETg: copolyester from Eastman Chemicals, Kingsport, TN, grade: EASTAR GN071

PCTg: copolyester from Eastman Chemicals, grade: VM318

TX1000: copolyester from Eastman Chemicals, brand: TRITANMX710: copolyester from Eastman Chemicals, brand: TRITAN TX2000: copolyester from Eastman Chemicals, brand: TRITAN MX730: copolyester from Eastman Chemicals, brand: TRITAN NEOSTAR: copolyester ether elastomer from Eastman Chemicals, grade: FN007

Ecdel 9967: copolyester ether elastomer from Eastman Chemicals

ELVALOY: copolymer of ethylene and methyl acrylate: from DowDuPont, Midland, MI, grade: ELVALOY 1609

TPU 65D: thermoplastic polyurethane from Lubrizol, Wickliffe, OH, grade PELLETHANE 65D Texin: thermoplastic polyurethane from Covestro, Pittsburgh, PA, grade RxT50D STPE: silicone thermoplastic elastomer copolymer of the type prepared in U.S. Pat. No. 5,214,119 (Leir) et al. and U.S. Pat. No. 8,765,881 (Hayes et al.)

ADMER: thermoplastic elastomer (TPE) from Mitsui Chemicals America, Rye Brook, NY, grade SE810

ZEONOR: thermoplastic cyclo olefin polymer (COP) from Zeon Chemicals, Louisville, KY, grade 1060R Properties of Selected Polyesters for Layers ABC Properties of some of the polymeric materials used in the examples below are shown in Table 1 below.

TABLE 1

| | Tg* | Tm* | Vicat Softening Temp.* | Flexural Modulus* | Elongation at Break* | Solubility Parameter ($cal^{1/2}$ $cm^{-3/2}$) | Inherent Viscosity (cc/gm)* | 2,2,4,4-Tetramethyl-1,3-cyclobutanediol |
|---|---|---|---|---|---|---|---|---|
| PETg | 80° C. | N/A | 76° C. | 2.1 GPa | 180% | 9.36 | 0.75 | N/A |
| PCTg | 81° C. | N/A | 79° C. | 1.8 GPa | 330% | 8.94 | N/A | N/A |
| TX1000 | 110° C. | N/A | 110° C. | 1.55 GPa | 210% | 9 | 0.724 | 25% |
| MX710 | 110° C. | N/A | 110° C. | 1.55 GPa | 210% | 9 | 0.724 | 25% |
| MX730 | 110° C. | N/A | N/A | 1.575 GPa | 210% | N/A | 0.64 | 30% |
| TX2000 | 120° C. | N/A | N/A | 1.59 GPa | 140% | N/A | 0.65 | 35% |
| TPU 65D | <0° C. | N/A | 107° C. | 0.22 GPa | 450% | N/A | N/A | N/A |
| TEXIN | <0° C. | N/A | 128° C. | 0.11 GPa | 480% | N/A | N/A | N/A |
| NEOSTAR | <0° C. | 205° C. | 170° C. | 0.2 GPa | 400% | 8.9 | 1.2 | N/A |
| ECDEL | <0° C. | 205° C. | 170° C. | 0.2 GPa | 400% | 8.9 | 1.2 | N/A |
| ELVALOY | <0° C. | 101° C. | 70° C. | 0.08 GPa | 740% | 8.7 | N/A | N/A |
| ADMER | <0° C. | N/A | 40° C. | <0.1 GPa | >200% | N/A | N/A | N/A |
| STPE | <0° C. | N/A | N/A | <0.1 GPa | >200% | <8 | N/A | N/A |
| ZEONOR | 100° C. | N/A | 99° C. | 2.1 GPa | 60% | N/A | N/A | N/A |

*as reported by supplier of the material

Summary of Test Procedures

The following test procedures were used in the examples below.

Flexural Modulus and Elongation at Break

The flexural modulus was tested according to ASTM D790-17 and tensile properties by ASTM D638-14. The specimen made by die cutting was placed in the grips of a universal testing machine. The stress-strain curve was then utilized to determine the modulus and elongation at break.

Coffee Stain Color Index

Coffee was used for the stain test. The sample was soaked in the coffee for 72 hours at 37° C. The resulting color change (DE) was measured before and after soaking using an X-Rite Color i7 benchtop spectrophotometer (Grand Rapids, Michigan). If the color change (DE) was larger than 10, the sample was rated as poor (−−). If the color change (DE) was less than 10, the sample was rated as Good (++).

Crack Resistance

The polymeric shells were tested for crack resistance using a manual operation of putting on and taking off the shells from a three-dimensional (3D) printed tooth mold. The polymeric shell was constantly soaked in water at 37° C. The durability of the polymeric shells was rated based on number of cycles for failure due to cracking. The minimal number of cycles considered acceptable for the Crack Resistance test is 150; greater than 300 cycles is considered good, greater than 400 cycles is considered very good, and greater than 450 cycles is considered excellent.

Stress Relaxation by Dynamic Mechanical Analyzer (DMA)

DMA 3-point bend rectangular specimens were tested in a TA Instruments Q800 DMA (New Castle, DE). Samples were preconditioned in water for 24 hours prior to testing. The preconditioned samples were then tested by single cantilever bending in a DMA machine enclosed with an environmental chamber kept at 37° C. and 95% relative humidity. Stress relaxation was monitored after applying 1% strain and strain recovery was measured after the stress was removed. The testing time was about 4 hours. The stress relaxation is determined by comparing the initial relaxation modulus to the 4 hour relaxation modulus at 37° C. and 2% strain. Force persistence can be defined, then, as 100% minus the % stress relaxation (e.g., a stress relaxation of 25% equates to a force persistence of 75%).

Interfacial Adhesion

An X-cut with dimensions 2.5 cm×2.5 cm was gently made to the example film substrate, at least through the skin layer, but not through the core layer. Then, 3M Polyester Tape 8403 was applied over the cut and subsequently removed. The interfacial adhesion was visually assessed based on if the skin or middle layer delaminated from the core layer. The interfacial adhesion between the substrate and the 3M Polyester Tape 8403 is about 150 gm/inch. An interfacial adhesion was assigned a result of "fail" if delamination from the tape occurred and thus presumably had an adhesion of lower than 150 gm/inch. An interfacial adhesion was assigned a result of "pass" if no delamination was observed and thus, presumably had an adhesion of greater than 150 gm/inch.

Folding Crazing Resistance

The film sample was cut into 1 cm wide stripe, hand-folded once, and then bent back to its original position. The folded area was inspected visually for crazing, meaning the network of fine cracks or fold line fractures in the folded region. The tested samples were given a number value result that approximated the number fold line fractures observed for the sample. A lower number is desirable and represents better Folding Crazing Resistance. See FIG. 5 for an illustration representing the Folding Crazing Resistance test results, with fractures increasing from left to right.

Vicat Softening Temperature

Vicat softening temperature was measured according to ASTM D1525-17.

Melting Temperature and Glass Transition Temperature

Melting temperature and glass transition temperature and heat of fusion (melting) were measured by Modulated Differential Scanning calorimetry (MDSC™), unless reported by manufacturer of the material. The specimens for MDSC analysis were prepared by weighing and loading 4-5 mg of the material into TA Instruments Tzero hermetic aluminum DSC sample pans with a pinhole in the lid. The specimens were analyzed using a TA Instruments Discovery 2500 Differential Scanning calorimeter (DSC2A-00886/LN2) system utilizing a heat-cool-heat method in temperature modulated mode (Method: −125 to 280° C. at 4° C./min. with a modulation amplitude of ±0.636° C. and a period of 60 sec.). After data collection, the thermal transitions are analyzed using the TA Universal Analysis program. If present, any glass transitions (Tg) or significant endothermic or exothermic peaks are evaluated. The glass transition temperatures are evaluated using the step change in the standard heat flow (HF) or reversing heat flow (Cp related/REV HF) curves. The onset, midpoint (half height), and end temperatures of the transition are noted as well as the change in heat capacity observed at the glass transition. Any peak transitions such as melting are evaluated using the heat flow (HF), reversing heat flow (REV HF) or non-reversing heat flow (NR HF) curves. Peak area values and/or peak minimum/maximum temperatures are also determined; peak integration results are normalized for sample weight and reported in J/g.

For semi-crystalline polymers which have multiple melting peaks (i.e., multiple melting temp ranges), the respective lower temperature peak area and higher temperature peak area values can be compared to generate a melt fraction ratio for each example. The endothermic peak areas for each feature are compared as a fraction of the crystal melt area under the peak against the total peak area values.

Solubility Parameter

The solubility parameter was estimated according to the group contribution method outlined in Chapter 3 of Sperling, L. H., Introduction to Physical Polymer Science, John Wiley & Sons, Inc.: Hoboken, New Jersey, 2006.

Haze and Transmission

Haze and transmission, as well as Expected haze and Expected transmission, were determined using a HAZE-GARD PLUS meter available from BYK-Gardner Inc., Silver Springs, MD, which was designed to comply with the ASTM D1003-13 standard. The specimen surface is illuminated perpendicularly with the transmitted light, measured with an integrating sphere (0°/diffuse geometry). The spectral sensitivity conforms to CIE standard spectral value function "Y" under illuminant C with a 2° observer.

Procedure for Thermoforming and Temperature Measurement

The film was formed into an article on a BIOSTAR VI pressure molding machine (Scheu-Dental GmbH, Iserlohn, Germany). To thermoform, a 125 mm diameter piece of film was heated for a specific time and then pulled down over a rigid-polymer model. Maximum temperature of the film was measured using an IR thermometer (FLIR TG165) before pulling down over the rigid-polymer model. The BIOSTAR chamber behind the film was pressurized to 90 psi for 15 seconds of cooling time, after which the chamber was vented to ambient pressure and the formed article and arch model were removed from the instrument and cooled down to room temperature under ambient condition. For Expected haze and transmission measurements, the sample film is not drawn over the model but otherwise subject to the same temperature and pressure increase as if the film was thermoformed into an article.

Example 1

A 5-layer CBABC (TX1000/NEOSTAR/TX1000/NEOSTAR/TX1000) film was extruded using a pilot scale coextrusion line equipped with a feedblock and film die. The skin layer (C) extruder was fed with the first rigid resin, TX1000. The skin layer (C) extrusion melt temperature was controlled at 505° F. (262.8° C.). The throughput was 4.3 lbs/hr (1.95 kg/hr). The core layer (A) extruder was also fed with the first rigid resin, 0 TX1000, and the extrusion melt temperature was controlled at 550° F. (288° C.). The core layer extrusion throughput was 11.6 lbs/hr (5.26 kg/hr). The middle layer (B) extruder was fed with a second thermoplastic elastomeric resin, NEOSTAR, and the extrusion temperature was controlled at 470° F. (243.3° C.). The middle layer extrusion throughput was 5.54 lbs/hr (2.51 kg/hr). The extruded sheet was chilled on a cast roll. The overall sheet thickness was controlled at 30 mils (0.76 mm).

The film was then subsequently thermally formed into a dental tray. As summarized in Table 2 below, the resulting dental tray had good modulus properties, good force persistence performance, good crack resistance, good stain resistance and good interfacial adhesion.

Example 2

A 5-layer CBABC (TX1000/ELVALOY/TX1000/ELVALOY/TX1000) film was extruded using a pilot scale coextrusion line equipped with a feedblock and film die. The skin layer (C) extruder was fed with the first rigid resin, TX1000. The skin layer (C) extrusion melt temperature was controlled at 505° F. (262.8° C.). The throughput was 4.3 lbs/hr (1.95 kg/hr). The core layer (A) extruder was also fed with the first rigid resin, TX1000, and the extrusion melt temperature was controlled at 550° F. (288° C.). The core layer extrusion throughput was 11.6 lbs/hr (5.26 kg/hr). The middle layer (B) extruder was fed with a second thermoplastic elastomeric resin, Elvaloy, and the extrusion temperature was controlled at 460° F. (237.8° C.). The middle layer extrusion throughput was 4.56 lbs/hr (2.07 kg/hr). The extruded sheet was chilled on a cast roll. The overall sheet thickness was controlled at 30 mils (0.76 mm).

The film was then subsequently thermally formed into a dental tray and the performance of the dental tray was summarized in Table 2.

Example 3

A 5-layer CBABC (0 MX730/ECDEL/0 MX730/ECDEL9967/MX730) film was extruded using a pilot scale coextrusion line equipped with a feedblock and film die. The skin layer (C) extruder was fed with the first rigid resin, MX730. The skin layer (C) extrusion melt temperature was controlled at 524° F. (273.3° C.). The throughput was 4.34 lbs/hr (1.97 kg/hr). The core layer (A) extruder was also fed with the first rigid resin, MX730, and the extrusion melt temperature was controlled at 530° F. (276.7° C.). The core layer extrusion throughput was 13.04 lbs/hr (5.91 kg/hr). The middle layer (B) extruder was fed with a second thermoplastic elastomeric resin, ECDEL, and the extrusion temperature was controlled at 406° F. (207.8° C.). The middle layer extrusion throughput was 4.2 lbs/hr (1.91 kg/hr). The extruded sheet was chilled on a cast roll and had an average haze of 2.5% and transmission of 89%. The overall sheet thickness was controlled at 30 mils (0.76 mm). The film was then subsequently thermal formed into a dental tray and summarized in Table 2.

Example 4

A 5-layer CBABC (MX710/ECDEL/MX710/ECDEL 9967/MX710) film was extruded using a pilot scale coextrusion line equipped with a feedblock and film die. The skin layer (C) extruder was fed with the first rigid resin, MX710. The skin layer (C) extrusion melt temperature was controlled at 524° F. (273.3° C.). The throughput was 56.34 lbs/hr (25.56 kg/hr). The core layer (A) extruder was also fed with the first rigid resin, MX710, and the extrusion melt temperature was controlled at 547° F. (286.1° C.). The core layer extrusion throughput was 141 lbs/hr (63.96 kg/hr). The middle layer (B) extruder was fed with a second thermoplastic elastomeric resin, ECDEL, and the extrusion temperature was controlled at 414° F. (212.2° C.). The middle layer extrusion throughput was 53.95 lbs/hr (24.47 kg/hr). The extruded sheet was chilled on a cast roll and had an average haze of 1.6% and transmission of 90.3%. The overall sheet thickness was controlled at 25 mils (0.625 mm). The film was then subsequently thermal formed against a flat mold. The maximum thermal forming temperature of the heated film was measured 226° C. by the IR thermometer. The Expected Haze of the thermoformed article was determined to be 1.5% and about 87.5% of the crystals in the thermoformed article were melted before 225° C.

Comparative Example 1

A single-layer polymeric film with 100% PETg resin was extruded through a film die using a pilot scale extruder at a throughput of 15 lbs/hr (22.7 kg/hr). The extrusion melt temperature was controlled to be 520° F. (271° C.). The extruded sheet thickness was controlled at 30 mils (0.76 mm).

The film was then subsequently thermally formed into a dental tray. As summarized in Table 2 below, the dental tray of single-layer PETg has a high modulus, which might result in patient discomfort upon initial seating on the dental arch.

Comparative Example 2

A 3-layer ABA (PCTg/TEXIN/PCTg) film was extruded using a pilot scale coextrusion line equipped with a multi-manifold die. Two extruders were used for the skin layer (A) and fed with the first rigid resin, PCTg. The skin layer (A) extrusion melt temperatures were controlled at 520° F. (271° C.). The throughput was kept at 13.7 lbs/hr (6.2 kg/hr) from each extruder. The core layer (A) extruder was fed with a second thermoplastic polyurethane, TEXIN, and the extrusion melt temperature was controlled at 410° F. (210° C.). The core layer extrusion throughput was 13 lbs/hr (5.9 kg/hr). The extruded sheet was chilled on a cast roll. The overall sheet thickness was controlled at 30 mils (0.76 mm).

The film was then thermally formed into a dental tray. As summarized in Table 2, the dental tray of 3-layer film had poor stress relaxation performance.

Comparative Example 3

A 5-layer CBABC (ZEONOR/ELVALOY/ZEONOR/ELVALOY/ZEONOR) film was extruded using a pilot scale coextrusion line equipped with a multi-manifold die. The skin layer (C) extruder was fed with the first rigid resin, ZEONOR. The skin layer (C) extrusion melt temperature was controlled at 464° F. (240° C.). The throughput was 5 lbs/hr (2.3 kg/hr). The core layer (A) extender was also fed with the first rigid resin, ZEONOR, and the extrusion melt temperature was controlled at 460° F. (240° C.). The core layer extrusion throughput was 15 lbs/hr (6.8 kg/hr). The middle layer (B) extruder was fed with a second thermoplastic elastomeric resin, ELVALOY, and the extrusion temperature was controlled at 470° F. (243.3° C.). The middle layer extrusion throughput was 32 lbs/hr (14.5 kg/hr). The extruded sheet was chilled on a cast roll. The overall sheet thickness was controlled at 30 mils (0.76 mm).

The film was then subsequently thermal formed into a dental tray. As summarized in Table 2 below, the resulting dental tray had very poor crack resistance.

Comparative Example 4

A 3-layer ABA (PCTg/STPE/PCTg) film was extruded using a pilot scale coextrusion line equipped with a feedblock and film die. The skin layer (A) extruder was fed with the first rigid resin, PCTg. The skin layer (A) extrusion melt temperature was controlled at 528° F. (275.6° C.). The throughput was 20.5 lbs/hr (9.3 kg/hr). The core layer (B) extruder was fed with a second thermoplastic elastomeric resin, STPE, and the extrusion temperature was controlled at 530° F. (276.7° C.). The core layer extrusion throughput was 10.2 lbs/hr (4.63 kg/hr). The extruded sheet was chilled on a cast roll. The overall sheet thickness was controlled at 30 mils (0.76 mm).

The film was then thermally formed into a dental tray. As summarized in Table 2 below, the resulting dental tray had very poor interfacial adhesion.

Comparative Example 5

A 5-layer CBABC (TX1000/ADMER/TX1000/ADMER/TX1000) film was extruded using a pilot scale coextrusion line equipped with a feedblock and film die. The skin layer (C) extruder was fed with the first rigid resin, TX1000. The skin layer (C) extrusion melt temperature was controlled at 505° F. (262.8° C.). The throughput was 4.3 lbs/hr (1.95 kg/11r). The core layer (A) extruder was also fed with the first rigid resin, TX1000, and the extrusion melt temperature was controlled at 550° F. (288° C.). The core layer extrusion throughput was 11.6 lbs/hr (5.26 kg/hr). The middle layer (B) extruder was fed with a second thermoplastic elastomeric resin, ADMER, and the extrusion temperature was controlled at 490° F. (254.4° C.). The middle layer extrusion throughput was 4.37 lbs/hr (1.98 kg/hr). The extruded sheet was chilled on a cast roll. The overall sheet thickness was controlled at 30 mils (0.76 mm).

The film was then thermally formed into a dental tray. As summarized in Table 2 below, the resulting dental tray had poor folding crazing resistance.

Comparative Example 6

10 mils TPU 65D film sample was obtained from Lubrizol, Wickliffe, OH, and 10 mils co-polyester film (PACUR HT) was obtained from Pacur, LLC, Oshkosh, WI. A 3-layer ABA (HT/TPU 65D/HT) tray was prepared by layer-by-layer thermoforming process. As summarized in Table 2 below, the resulting dental tray had very poor interfacial adhesion.

Comparative Example 7

A dental tray available from Align Technologies, San Jose, CA, under the trade designation INVISALIGN SMARTTRACK, was tested. As summarized in Table 2 below, the tray had very poor stain resistance.

Comparative Example 8

A single-layer polymeric film with 100% TX1000 resin was extruded through a film die using a pilot scale extruder at a throughput of 15 lbs/hr (22.7 kg/hr). The extrusion melt temperature was controlled to be 550° F. (288° C.). The extruded sheet thickness was controlled at 30 mils (0.76 mm). The film was then subsequently thermally formed into a dental tray. As summarized in Table 2 below, the dental tray of single-layer TX1000 has poor crack resistance.

Comparative Example 9

A single-layer polymeric film with 100% MX730 resin was extruded through a film die using a pilot scale extruder at a throughput of 15 lbs/hr (22.7 kg/hr). The extrusion melt temperature was controlled to be 536° F. (276.7° C.). The extruded sheet thickness was controlled at 30 mils (0.76 mm). The film was then subsequently thermally formed into a dental tray. As summarized in Table 2 below, the dental tray of single-layer MX730 has poor crack resistance.

Comparative Example 10

A 5-layer CBABC (TX2000/NEOSTAR/TX2000/NEOSTAR/TX2000) film was extruded using a pilot scale coextrusion line equipped with a feedblock and film die. The skin layer (C) extruder was fed with the first rigid resin, TX2000. The skin layer (C) extrusion melt temperature was controlled at 541° F. (282.8° C.). The throughput was 6.3 lbs/hr (2.86 kg/hr). The core layer (A) extruder was also fed with the first rigid resin, TX2000, and the extrusion melt temperature was controlled at 562° F. (294.4° C.). The core layer extrusion throughput was 11.59 lbs/hr (5.26 kg/hr). The middle layer (B) extruder was fed with a second thermoplastic elastomeric resin, NEOSTAR, and the extrusion temperature was controlled at 399° F. (203.9° C.). The middle layer extrusion throughput was 5.6 lbs/hr (2.54 kg/hr). The extruded sheet was chilled on a cast roll and had an average haze of 3.3% and transmission of 89%. The overall sheet thickness was controlled at 30 mils (0.76 mm).

The film was then subsequently thermal formed into a dental tray. As summarized in Table 2 below, the resulting dental tray had poor crack resistance.

Comparative Example 11

A 5-layer CBABC (MX710/ECDEL/MX710/ECDEL/MX710) film was extruded using a pilot scale coextrusion line equipped with a feedblock and film die. The skin layer (C) extruder was fed with the first rigid resin, MX710. The skin layer (C) extrusion melt temperature was controlled at 524° F. (273.3° C.). The throughput was 56.34 lbs/hr (25.56 kg/hr). The core layer (A) extruder was also fed with the first rigid resin, MX710, and the extrusion melt temperature was controlled at 547° F. (286.1° C.). The core layer extrusion throughput was 141 lbs/hr (63.96 kg/hr). The middle layer (B) extruder was fed with a second thermoplastic elastomeric resin, ECDEL, and the extrusion temperature was controlled at 414° F. (212.2° C.). The middle layer extrusion throughput was 53.95 lbs/hr (24.47 kg/hr). The extruded sheet was chilled on a cast roll and had an average haze of 1.6% and transmission of 90.3%. The overall sheet thickness was controlled at 25 mils (0.625 mm). The film was then subsequently thermal formed against a flat mold. The maximum thermal forming temperature of the heated film was measured 240° C. by the IR thermometer. The Expected Haze of the thermoformed article was determined to be 21%. and about 76.4% of the crystals in the thermoformed article were melt below 225° C.

TABLE 2

| | Modulus | DMA Stress Relaxation at 95% RH | Aligner Tray On/Off Cycling Crack Resistance Test (# of cycle to break) | Staining Resistance to coffee | Interfacial Adhesion | Folding Crazing Resistance |
|---|---|---|---|---|---|---|
| Example 1 | 1.23 GPa | 31.95% | ≥450 | Good | Pass | Good |
| Example 2 | 1.21 GPa | 32.80% | ≥450 | Good | Pass | Good |
| Example 3 | N/A | N/A | ≥450 | Good | Pass | Good |
| Comparative Example 1 | 2.1 GPa | 41.7% | 333 | Good | N/A | N/A |
| Comparative Example 2 | 1.2 GPa | 45.60% | N/A | Good | Pass | Good |
| Comparative Example 3 | 1.47 GPa | 26.20% | <10 | Good | N/A | Poor |
| Comparative Example 4 | N/A | N/A | N/A | N/A | Fail | N/A |
| Comparative Example 5 | 1.22 GPa | N/A | N/A | N/A | N/A | Poor |
| Comparative Example 6 | N/A | N/A | N/A | N/A | Fail | N/A |
| Comparative Example 7 | N/A | N/A | N/A | Poor | N/A | N/A |
| Comparative Example 8 | N/A | N/A | 87 | N/A | N/A | N/A |
| Comparative Example 9 | N/A | N/A | <10 | N/A | N/A | N/A |
| Comparative Example 10 | N/A | N/A | 81 | N/A | N/A | N/A |

Various embodiments of the invention have been described. These and other embodiments are within the scope of the following claims.

The invention claimed is:

1. A method of controlling haze in a thermoformed article, the method comprising:
providing a sheet of film comprising an interior region and an exterior region, the interior region comprising at least three alternating layers including:
a core layer having a first major surface and a second major surface, the core layer including a first thermoplastic polymer A having a thermal transition temperature from about 70° C. to about 140° C. and a flexural modulus greater than about 1.3 GPa;
a first interior layer adjacent to the first major surface of the core layer;
a second interior layer adjacent to the second major surface of the core layer, wherein the first interior layer and the second interior layer each independently comprise a second thermoplastic polymer B, different from the first thermoplastic polymer A, the second thermoplastic polymer B having a glass transition temperature of less than about 0° C. and a flexural modulus less than about 1 GPa;

wherein at least one of the layers of the interior region comprises a semi-crystalline polymer, and wherein the exterior region comprises a first exterior layer on a first side of the interior region and a second exterior layer on a second side of the interior region, each exterior layer independently comprising a third thermoplastic polymer C, the third thermoplastic polymer C being the same as or different from the first thermoplastic polymer A;

providing a first positive model;

drawing the sheet over the first positive model at a molding temperature, the molding temperature being at least about 5° C. lower than an upper end temperature of a primary melting transition of the semi-crystalline polymer, as determined by differential scanning calorimetry (DSC); and cooling the sheet and the first positive model to atmospheric temperature to form an article, wherein the formed article has an Expected haze, as measured according to ISO 14782 or ASTM D1003, of less than 10%.

2. The method of claim 1, wherein the article is a tray aligner, and wherein the first positive model is representative of a patient's dentition.

3. The method of claim 1, wherein the semi-crystalline polymer is a polyester or copolyester.

4. The method of claim 3, wherein the polyester or the copolyester is chosen from copolyester ether, copolymers of ethylene and (meth)acrylates, polyethylene terephthalate (PET), polyethylene terephthalate glycol (PETg), polycyclohexylenedimethylene terephthalate (PCT), 2,2,4,4-tetramethyl-1,3-cyclobutanediol modified PCT, PEN, and mixtures and combinations thereof.

5. The method of claim 1, wherein the semi-crystalline polymer is a copolyester ether elastomer having an elongation at break of greater than about 150%.

6. The method of claim 1, wherein the first thermoplastic polymer A is semi-crystalline and has an elongation at break of greater than about 150%.

7. The method of claim 1, wherein the molding temperature is no greater than 220° C.

8. The method of claim 1, wherein at least 80% of crystalline structures present in the sheet prior to thermoforming are melted.

9. The method of claim 1, and further comprising:

identifying, by modulated DSC (MDSC), the primary melting transition of the semi-crystalline polymer; and selecting the molding temperature based at least in part on the primary melting transition.

10. The method of claim 1, wherein the formed article has an Expected light transmission of greater than 80%.

11. The method of claim 1, wherein the at least one layer includes a nucleating agent.

12. The method of claim 11, wherein the nucleating agent is a sorbitol.

13. The method of claim 11, wherein the nucleating agent is present at a concentration of between about 0.1 wt % and 1.0 wt %, based on a total weight of the semi-crystalline polymer.

14. The method of claim 1, wherein the sheet is a multilayer sheet including a core layer, a skin layer, and at least one inner layer disposed between the core layer and the skin layer, and wherein the at least one inner layer includes the semi-crystalline polymer.

15. The method of the claim 14, wherein at least one of the core layer or the skin layer includes amorphous elastomer.

16. A dental appliance comprising:

a polymeric shell comprising a plurality of cavities for receiving one or more teeth, wherein the polymeric shell has an Expected haze of less than 10%, as measured according to ISO 14782 or ASTM D1003, and wherein the polymeric shell comprises an interior region and an exterior region, the interior region comprising at least three alternating layers, the interior region comprising:

a core layer having a first major surface and a second major surface, the core layer comprising a first thermoplastic polymer A having a thermal transition temperature from about 70° C. to about 140° C. and a flexural modulus greater than about 1.3 GPa;

a first interior layer adjacent to the first major surface of the core layer;

a second interior layer adjacent to the second major surface of the core layer, wherein the first interior layer and the second interior layer each independently comprise a second thermoplastic polymer B, different from the first thermoplastic polymer A, the second thermoplastic polymer B having a glass transition temperature of less than about 0° C. and a flexural modulus less than about 1 GPa, and wherein at least one of the layers of the interior region comprises a semi-crystalline polymer; and wherein the exterior region of the polymeric shell comprises a first exterior layer on a first side of the interior region and a second exterior layer on a second side of the interior region, each exterior layer independently comprising a third thermoplastic polymer C, the third thermoplastic polymer C being the same as or different from the first thermoplastic polymer A.

17. The dental appliance of claim 16, wherein the polymeric shell includes a multilayer film including a core layer, a skin layer, and at least one inner layer disposed between the core layer and the skin layer, and wherein the at least one inner layer includes the semi-crystalline polymer.

18. A multilayer composite sheet for thermoforming a dental appliance, the sheet comprising:

an interior region having at least three alternating layers, the interior region comprising:

a core layer having a first major surface and a second major surface, the core layer including a first thermoplastic polymer A having a thermal transition temperature from about 70° C. to about 140° C. and a flexural modulus greater than about 1.3 GPa;

a first interior layer adjacent to the first major surface of the core layer;

a second interior layer adjacent to the second major surface of the core layer, wherein the first interior layer and the second interior layer each independently comprise a second thermoplastic polymer B, different from the first thermoplastic polymer A, the second thermoplastic polymer B having a glass transition temperature of less than about 0° C. and a flexural modulus less than about 1 GPa, and wherein at least one of the layers of the interior region comprises a semi-crystalline polymer configured to control haze in a formed article; and external layers on opposing sides of the interior region, each external layer independently comprising a third thermoplastic polymer C, the third thermoplastic polymer C being the same as or different from the first thermoplastic polymer A.

19. The multilayer composite sheet of claim 18, wherein the first thermoplastic polymer A has an elongation at break of greater than about 150%.

20. The multilayer composite sheet of claim 18, wherein the multilayer composite sheet has an overall flexural modulus in a range of about 0.8 GPa to about 1.5 GPa.

* * * * *